E. C. BOERNER.
NUT CASTELLATING MACHINE.
APPLICATION FILED APR. 2, 1914.
1,217,396.
Patented Feb. 27, 1917.
10 SHEETS—SHEET 4.
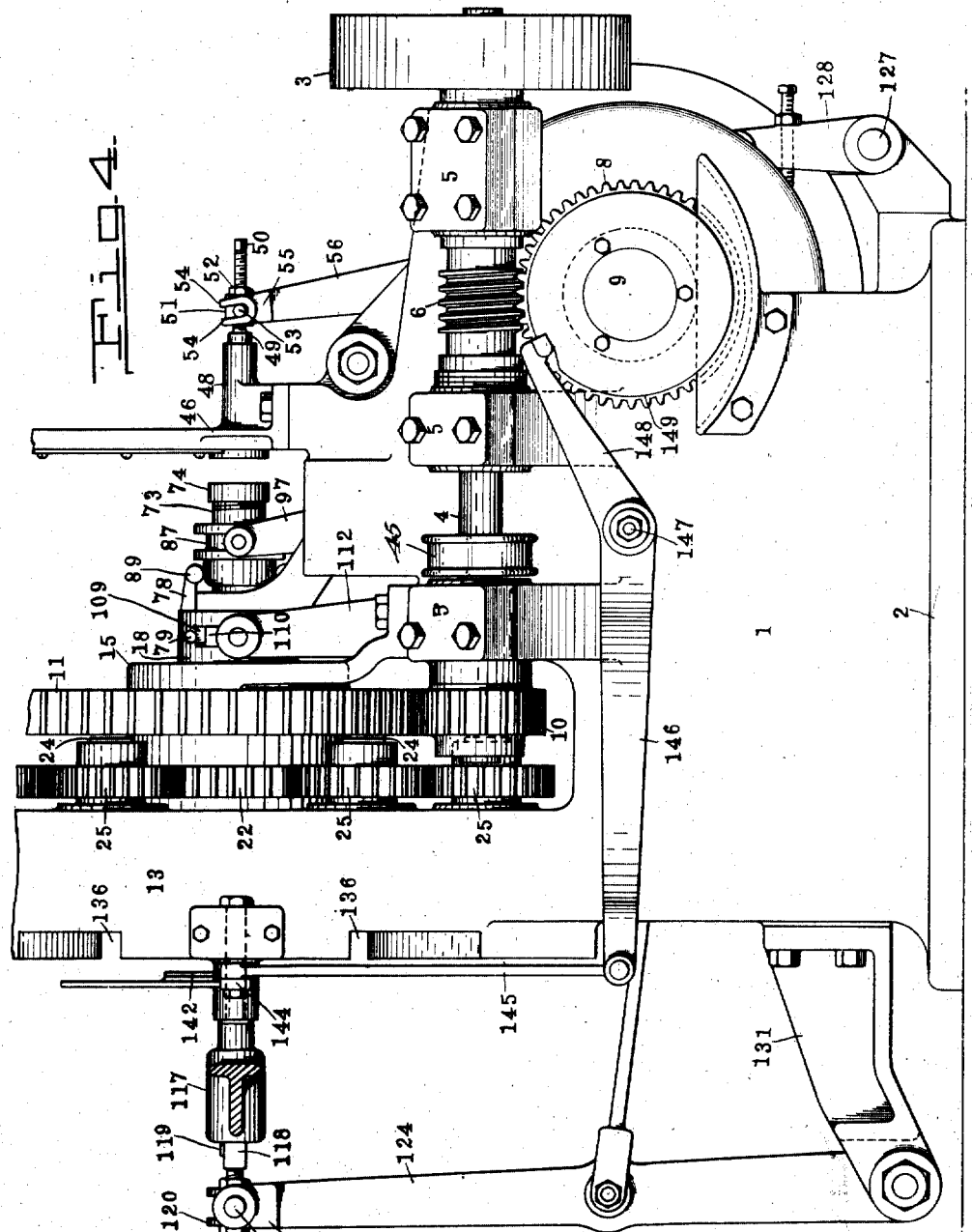
WITNESSES:
INVENTOR
E. C. Boerner
BY
Duell, Warfield & Duell
ATTORNEYS

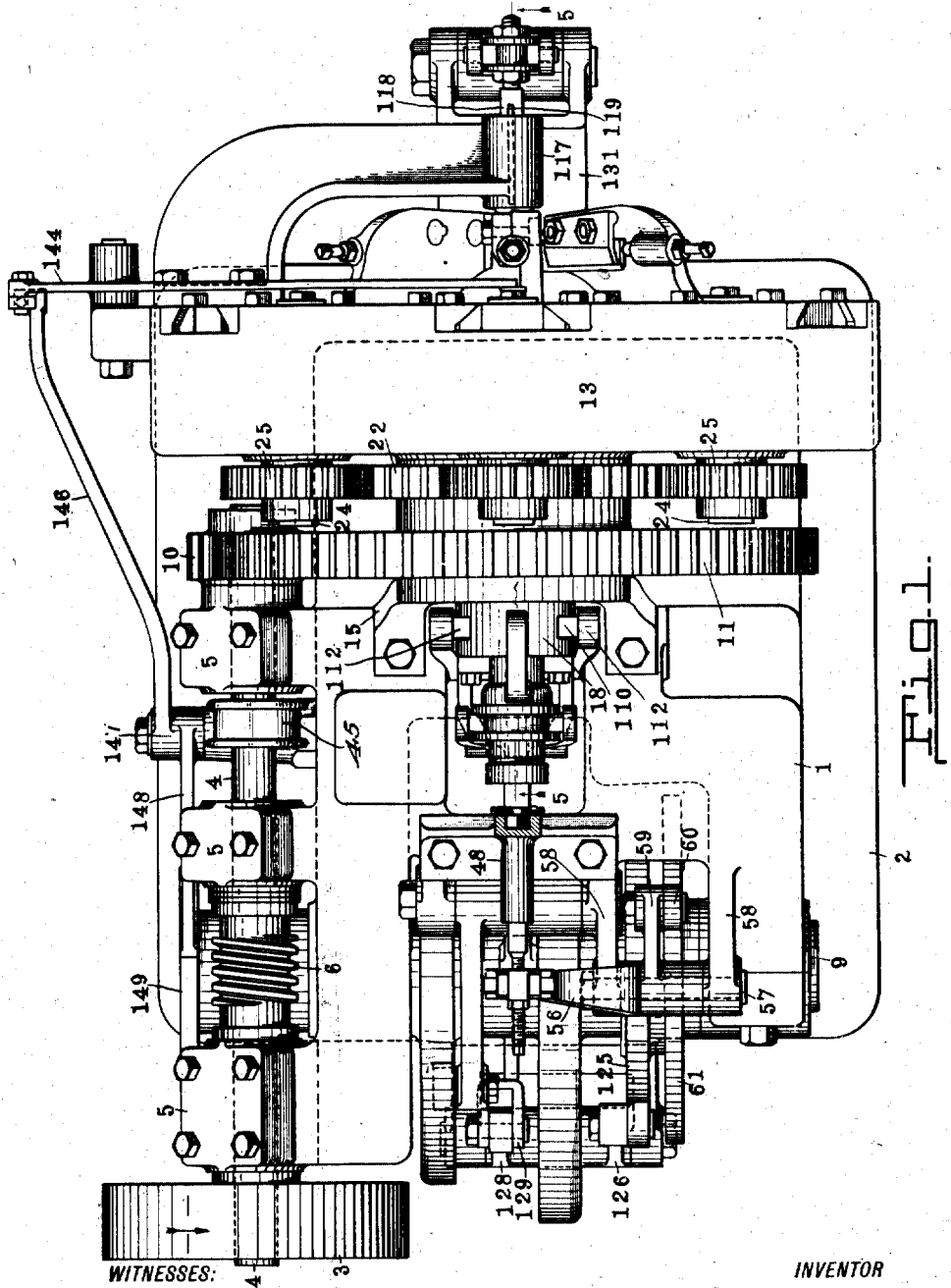

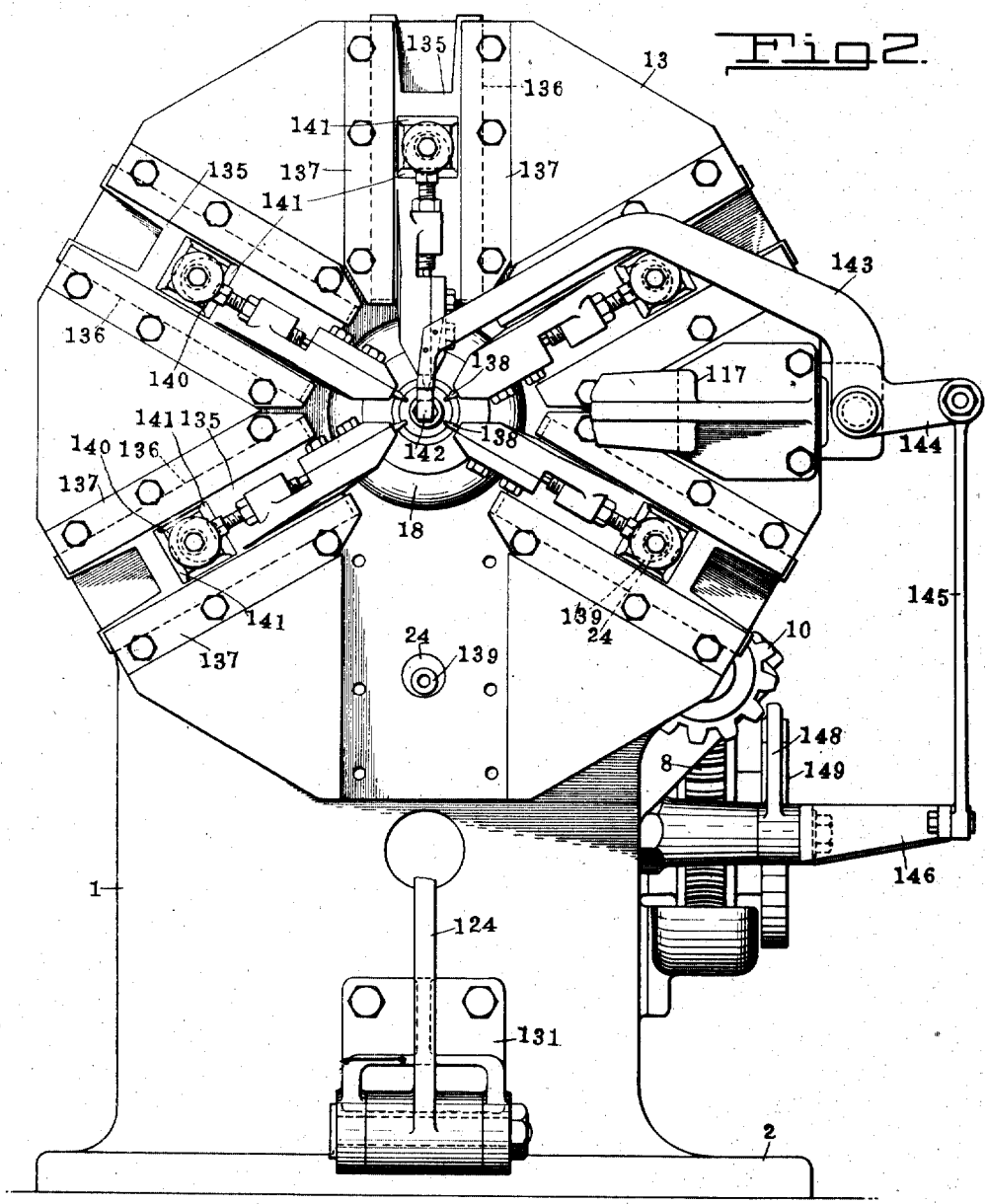

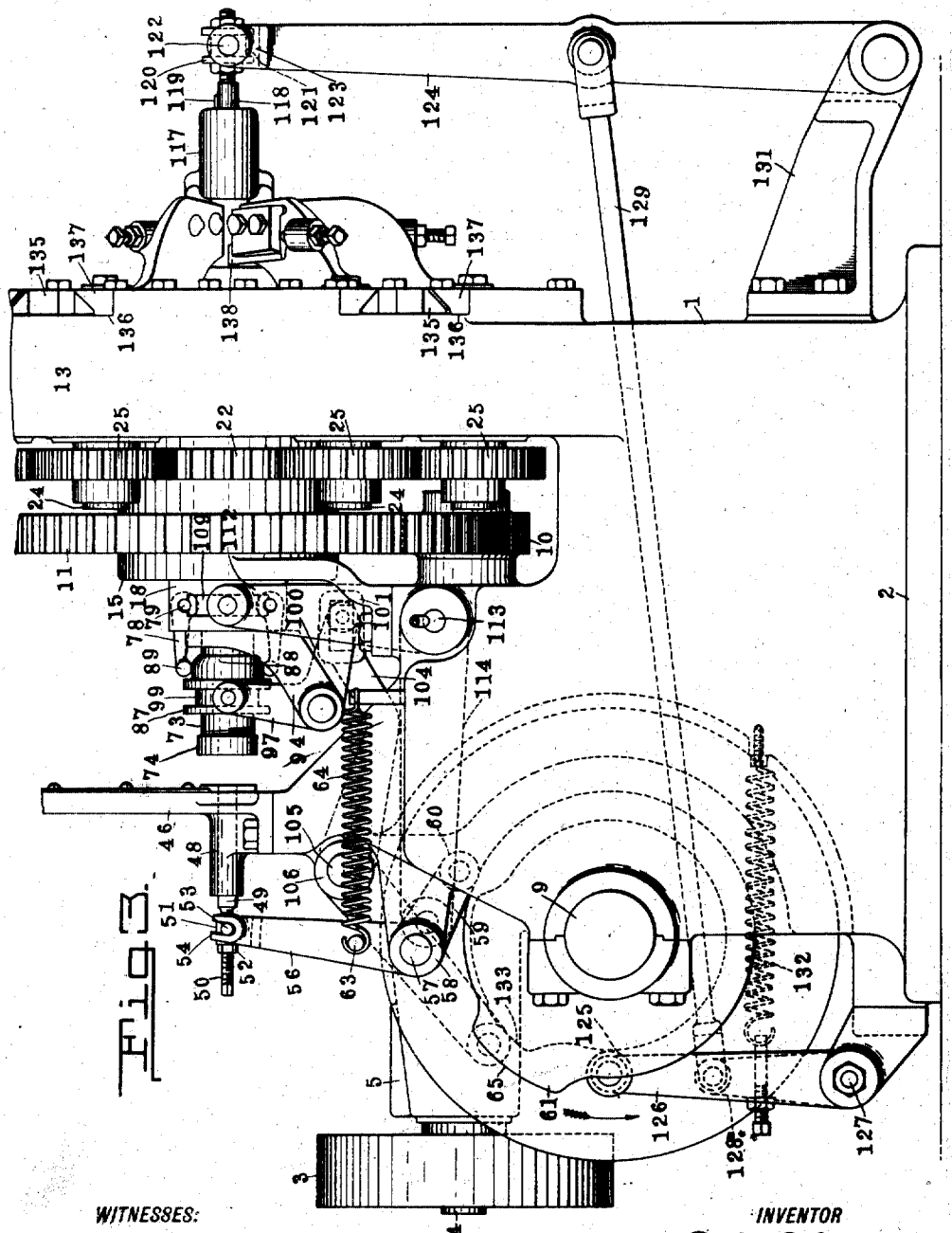

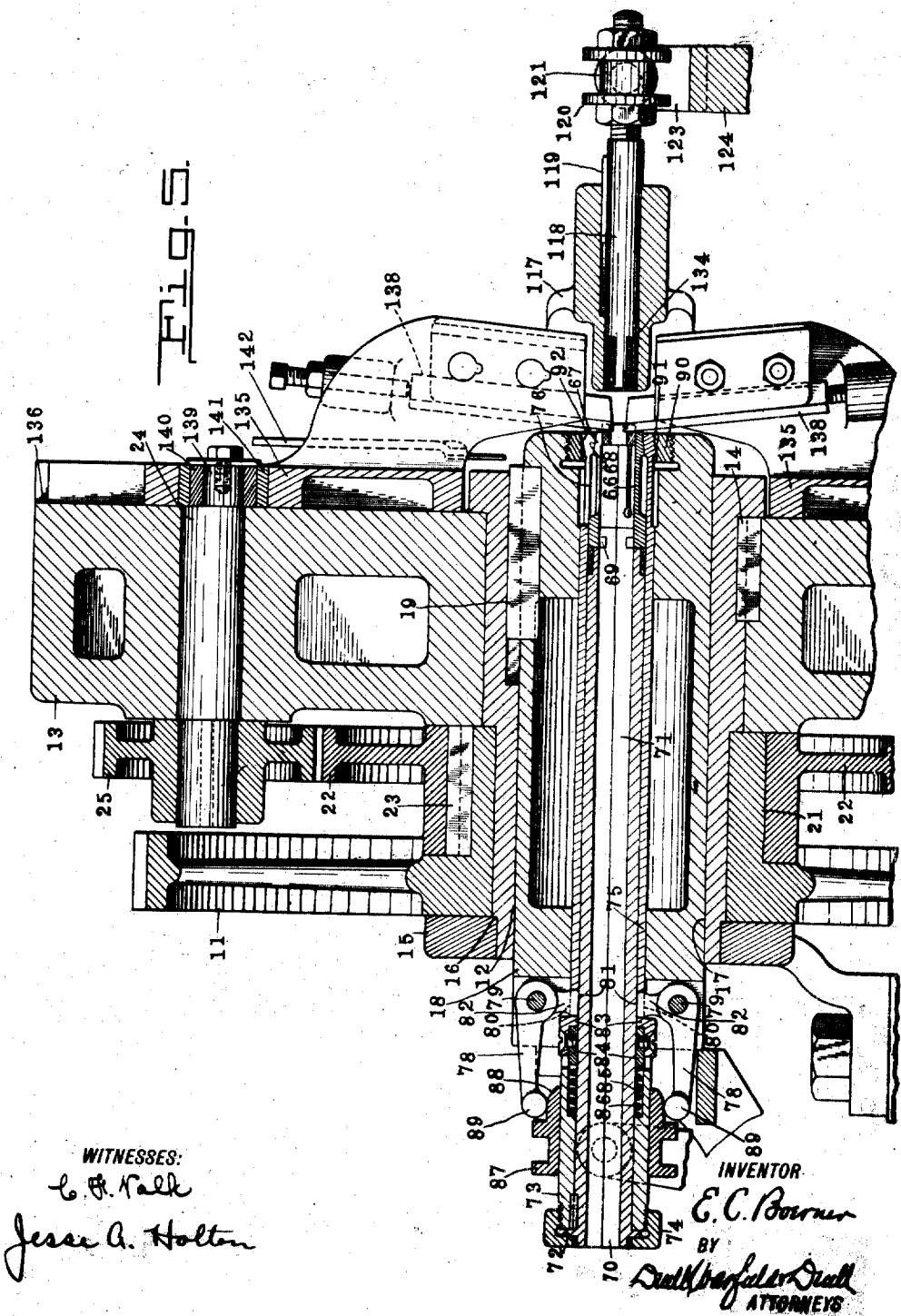

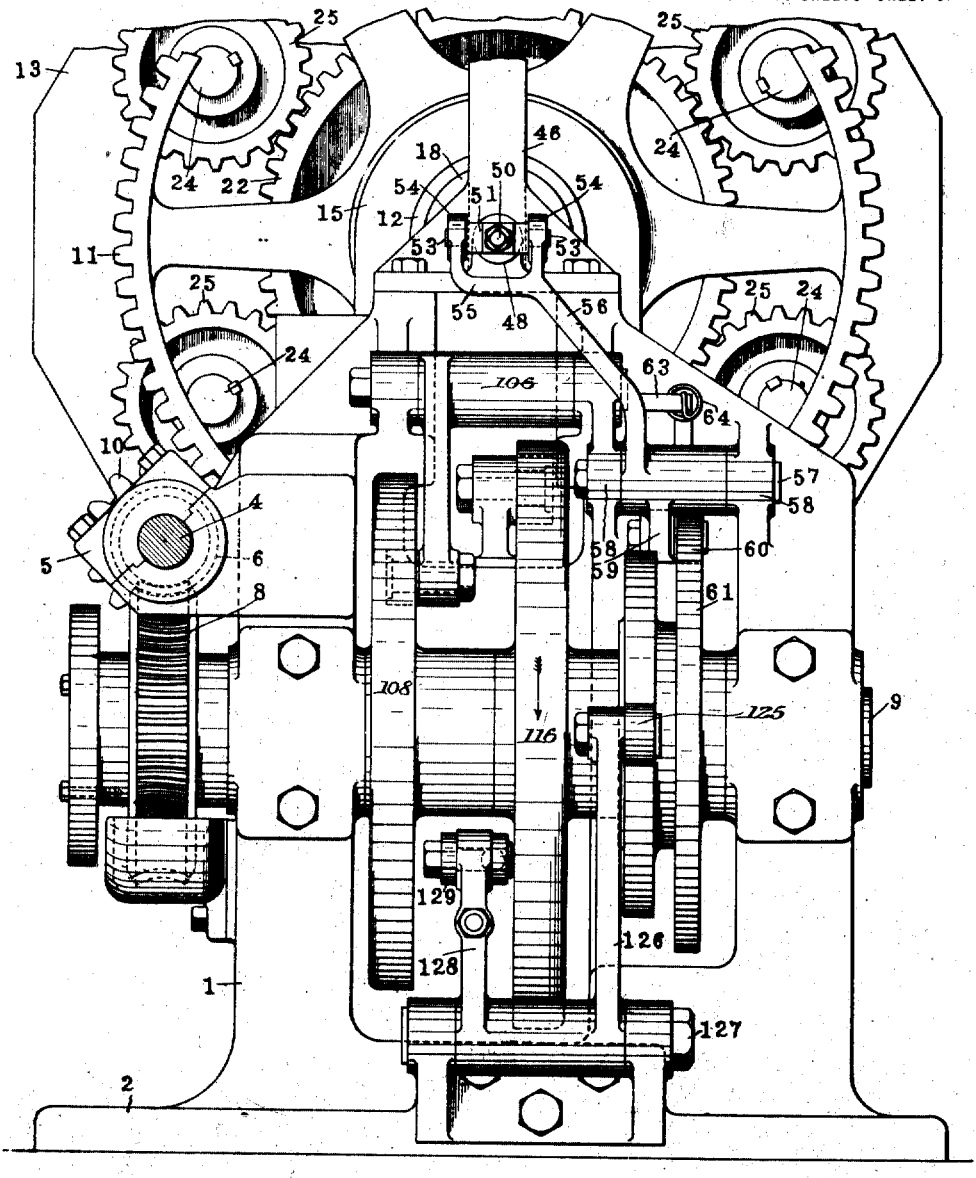

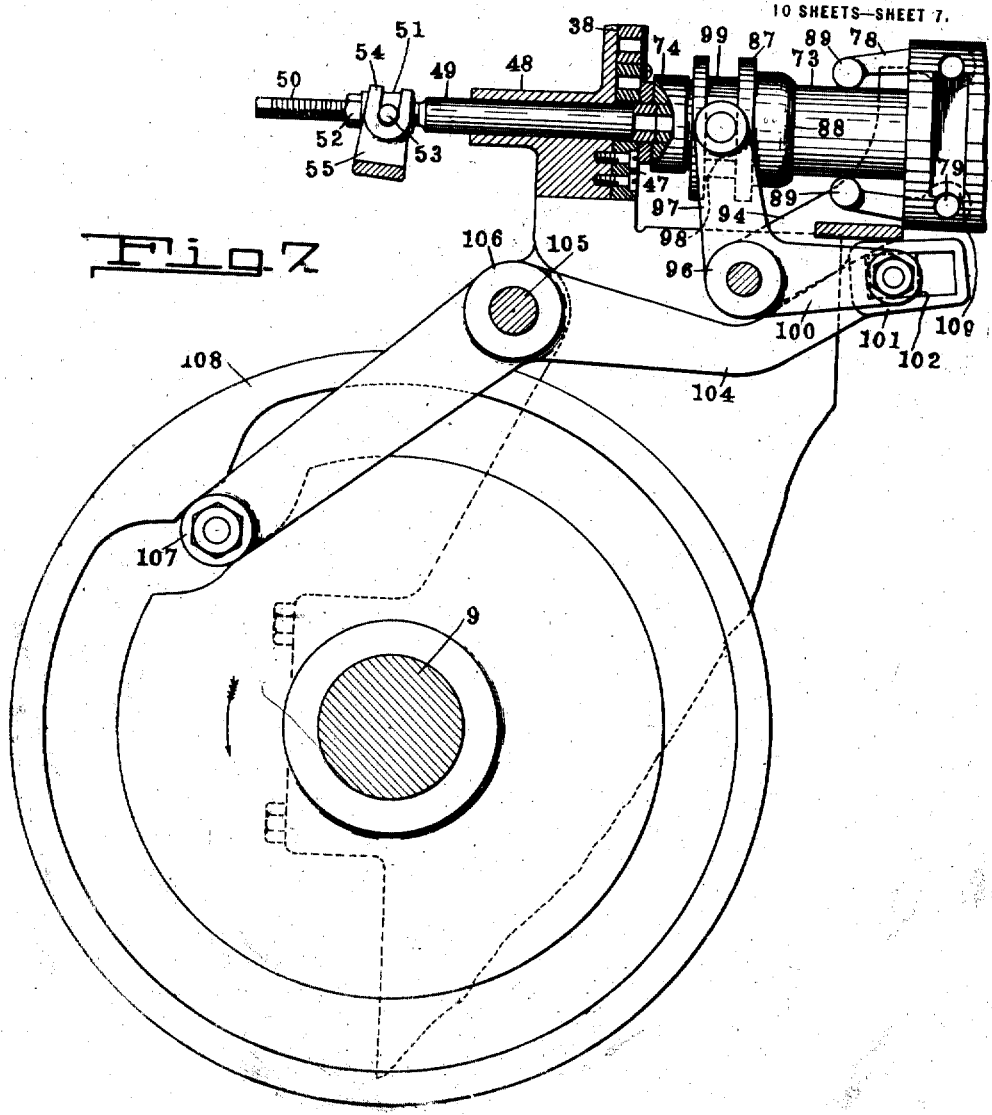

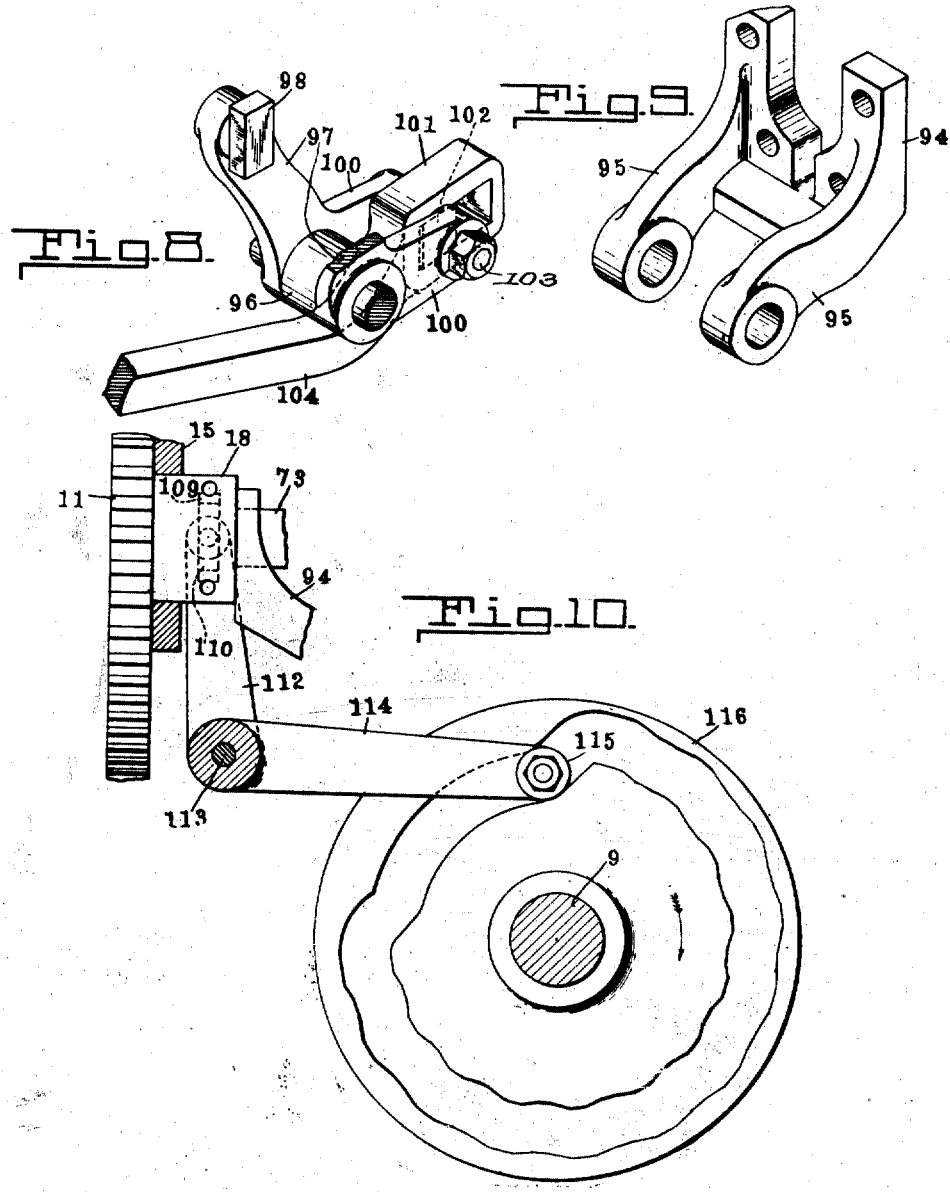

E. C. BOERNER.
NUT CASTELLATING MACHINE.
APPLICATION FILED APR. 2, 1914.
1,217,396.
Patented Feb. 27, 1917.
10 SHEETS—SHEET 9.
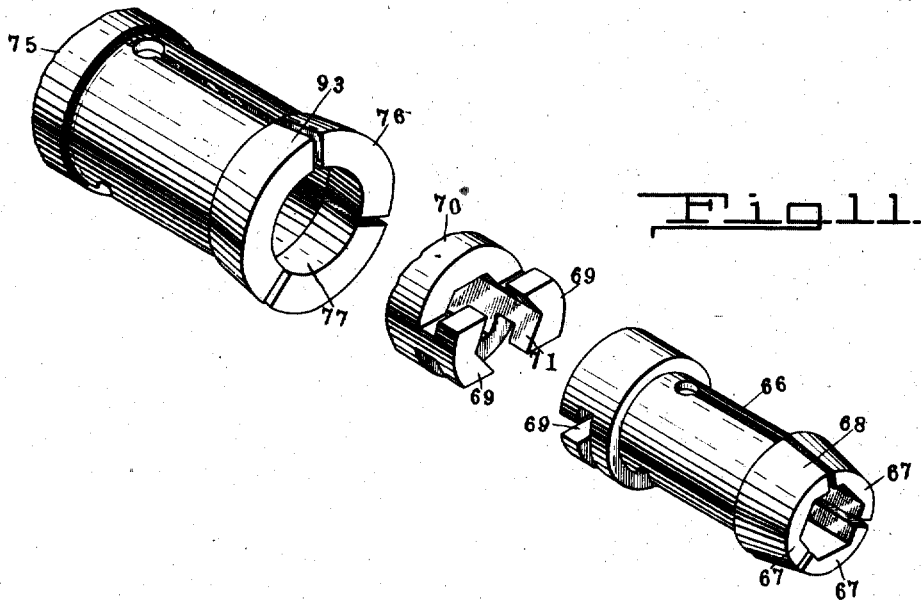
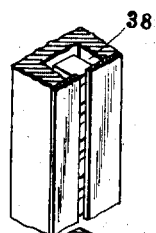
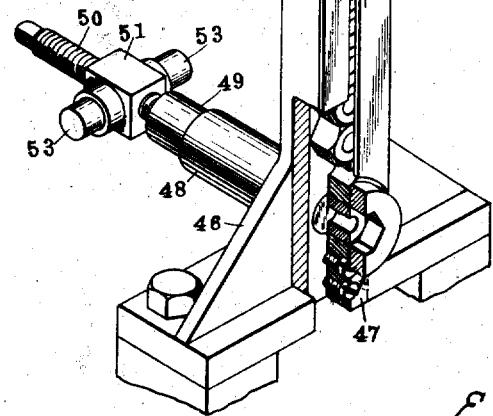
WITNESSES:
INVENTOR
E. C. Boerner
BY
ATTORNEYS

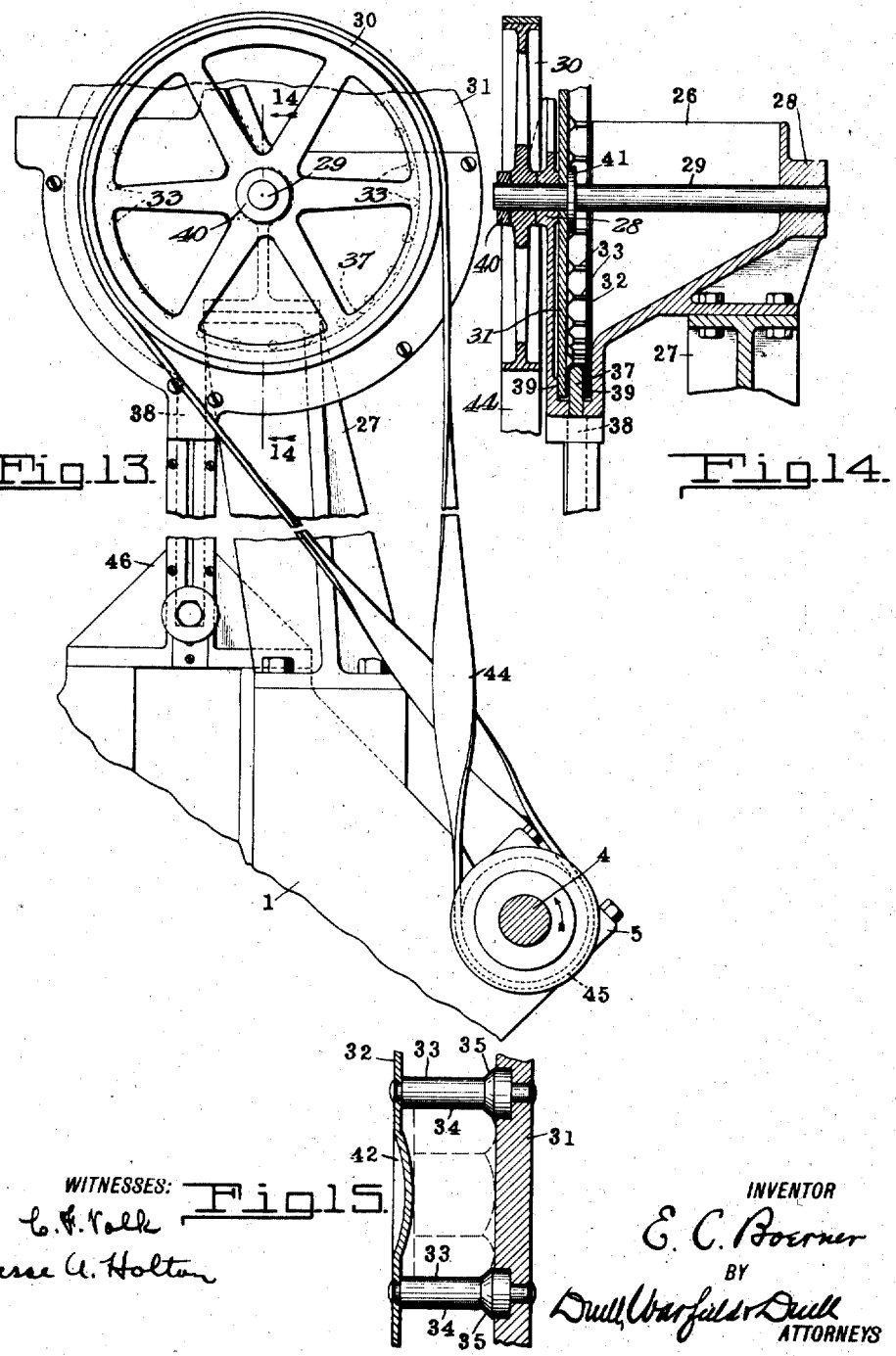

UNITED STATES PATENT OFFICE.

EMILE C. BOERNER, OF PORT CHESTER, NEW YORK, ASSIGNOR TO RUSSELL, BURDSALL & WARD BOLT AND NUT CO., OF PORT CHESTER, NEW YORK, A CORPORATION OF NEW YORK.

NUT-CASTELLATING MACHINE.

1,217,396.  Specification of Letters Patent.  Patented Feb. 27, 1917.

Application filed April 2, 1914. Serial No. 828,976.

*To all whom it may concern:*

Be it known that I, EMILE C. BOERNER, a citizen of the United States, residing at Port Chester, in the county of Westchester and State of New York, have invented certain new and useful Improvements in Nut-Castellating Machines, of which the following is a full, clear, and exact description, such as will enable others skilled in the art to which it appertains to make and use the same.

This invention relates to blank shaping machines, and with respect to certain more specific features thereof, to machines for slotting or "castellating" nut-blanks.

The invention has for one of its objects to provide a simple and practical blank shaping machine.

Another of the objects of the invention is to provide a rapidly operating automatic machine for the production of castellated nut-blanks.

It is another object of the invention to provide a castellating machine of such simple construction and convenient arrangement of parts that the same may be operated by relatively unskilled workmen.

The provision of an apparatus having certain parts adapted to yield under unusual conditions, for the purpose of preventing breakage of the parts or strains thereon, is another object of the invention.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawings wherein is shown one of various possible embodiments of the invention,—

Figure 1 is a plan view of a nut-castellating machine;

Fig. 2 is a view in front elevation of the same;

Fig. 3 is a left side elevational view of the same;

Fig. 4 is a right side elevational view of the same;

Fig. 5 is a central longitudinal sectional view taken on the line 5—5 of Fig. 1;

Fig. 6 is a rear end elevational view of the machine;

Fig. 7 is a fragmentary view showing the means for actuating the grippers;

Figs. 8 and 9 are detail views of certain of the parts shown in Fig. 7;

Fig. 10 is a view of the means for actuating the nut-blank holder;

Fig. 11 is a view in perspective of the chuck or nut-gripping means disassembled;

Fig. 12 is a perspective view of the supply chute, partly broken away to show more clearly the interior structure;

Fig. 13 is a view in front elevation of the nut-blank selecting and supplying mechanism;

Fig. 14 is a central sectional view of the same, taken on the line 14—14, looking in the direction of the arrow; and Fig. 15 is a detail view in section of a portion of the nut-blank selecting mechanism.

Similar reference characters refer to similar parts throughout the several views of the drawings.

Continuing now by way of more detailed description, it may be stated as preliminary that the preferred embodiment of the invention comprises: (1) means adapted to select nut-blanks from a hopper and supply them in a uniform manner to a feeding mechanism; (2) means adapted to feed the nut-blanks to a holder or gripping mechanism; (3) holding means for the nut-blanks; (4) means adapted to cause register of said nut-blanks with said holding means; (5) means adapted to shape the nut-blanks; (6) means adapted to discharge the nut-blanks; and (7) other mechanism.

It is to be understood that the above-mentioned elements are designated as included in the embodiment shown in the drawings and which will be particularly described hereinafter, and it will be obvious, further, that while this embodiment is shown and described as applicable to nut-blanks, yet the invention in its broad aspect contemplates an adaptability to blanks of an entirely different character.

There is indicated at 1 a machine body having a base portion 2 and adapted to support the working parts of the apparatus. A driving-pulley 3 is fixedly mounted on a shaft 4, which in turn is supported in various journal boxes, as indicated at 5. A worm 6 is also mounted on the shaft 4 in fixed relation therewith and meshes with a worm wheel 8 which in turn is secured to a cam shaft 9. This cam shaft carries a number of cams which in turn coact with respective cam levers to actuate certain of the mechanisms, as will be hereinafter set forth in detail. The shaft 4 which carries the driving pulley 3 and the worm 6 carries also, at one end, a pinion 10 which meshes with a large gear 11 (shown in Figs. 1 and 6 of the drawings). This gear 11 is loosely mounted for rotation on a hollow hub member 12 (Fig. 5) arranged in an upstanding portion 13 of the body 1. This hub member has a forward flange abutting the front side of said upright portion whereby the same is held against longitudinal rearward movement, and said hub is held against rotary displacement by a key 14. A collar member 15 is provided upon the rear reduced end of the hub member 12 abutting a shoulder 16, and said collar coöperates with said flange to hold the hub in correct longitudinal relation to the upstanding portion 13. The hub is further provided with a longitudinal cylindrical bore 17 within which is supported a carrier 18, the same being splined at 19, thereby permitting lengthwise movement therein while preventing relative rotary movement. The large gear 11, which is loosely mounted on the hub member 12, has a hub portion 21 on which is mounted a smaller gear 22, the latter being held against angular displacement with the former by means of a key 23, or in some other suitable manner. Disposed in the upstanding portion 13 of the body 1, at points equi-distant from the axis of said carrier, are a number of short rotatable shafts 24. Each shaft carries in fixed relation therewith a pinion 25 at the rear of the upstanding portion or upright 13, and these pinions are adapted, respectively, to mesh with the common small gear 22.

It will be obvious that motion imparted to the driving shaft 4 through the driving pulley 3 rotates the worm 6 and the pinion 10 which is fixed on the end of said driving shaft. The worm 6 in turn drives the worm wheel 8, causing rotation of the cam shaft 9, and the pinion 10 meshing with the large gear 11 causes rotation of the latter on the hollow hub member 12, which, acting through the smaller gear 22, causes simultaneous rotation of the short shafts 24 mounted in the upright 13. These shafts are provided with eccentric mechanism connecting with reciprocatory planers, as will be hereinafter fully described.

Taking up now in detail a description of the various functional mechanisms as nearly as possible in the order of their operation: The means for selecting and supplying nut-blanks comprises a hopper 26 mounted on a bracket 27, which in turn is suitably secured to the body 1 of the machine. This hopper is provided with bearings 28 for a shaft 29, on one end of which is fixed a pulley 30 and which carries fixed thereto a pair of rotary plates 31, 32. These plates are spaced apart sufficiently to accommodate a nut-blank, if the same be introduced by the dimension of its thickness. Extending beyond these plates near the outer circumference thereof is an annular arrangement of pins 33, each pin having a shank portion 34 and a conical head portion 35 enlarging from said shank portion toward the rotary plate 31. Extending adjacent the outer circumference of this annular arrangement of pins for a certain distance is a curved plate 37 which is supported in fixed relation with the hopper 26 and terminates opposite a chute member 38. The extreme outer circumferential portion of each of the rotary plates 31 and 32 rides between the plate 37 and side walls 39 of the hopper. Collars are provided, as indicated at 40 and 41, on the shaft 29 to restrict longitudinal movement of said shaft in the hopper and hold the rotary plates in their proper positions. Referring to Fig. 15 of the drawings, it will be seen that the rotary plate 32 is provided with indentations 42 extending toward the inner wall of the rotary plate 31. The transverse distance between the pins 33 is sufficient to permit of the passage of a nut-blank therethrough in the dimension of its width. The conical head portions, however, on these pins foreshorten the distance to an extent sufficient to prevent passage therethrough of a nut-blank in the dimension of its width opposite these conical head portions. The nut-blanks used in this particular embodiment of the invention are hexagonal and are preferably crowned to give them a finished appearance. The machine calculates an operation on the crowned face of each nut, and accordingly it is desirable to present the nuts with their crown faces in position to be operated upon by the planing mechanism which will be hereinafter described. The nut-blanks fall by gravity from the hopper in between the rotary plates, which are constantly rotated by means of the shaft 29, being driven through the medium of the pulley 30, the belt 44 and a lower pulley 45, which in turn is driven from the main driving shaft, and are not permitted to pass between adjacent pins 33, unless said nuts are presented with their crown faces against the rotary plate 31. If, however, the crown faces are presented against the rotary plate 31 the crowning sufficiently relieves the nuts at points opposite the conical head portions of the pins to permit the same to pass therebetween. The plates in their rotary movement may then advance the nut beyond the segmental plate 37 and opposite the chute portion 38. Nuts which are not presented in proper position may be carried along in the rotation of the plates 31 and 32 until they have been moved into a position above the shaft 29, where there will be a tendency to cause them to fall back into the hopper. The fallen nuts may then again move down between the rotary plates, possibly this time in proper position to pass between the pins. The chute member 38 extends downwardly and is suitably supported by a bracket 46 secured to the body 1 of the machine. This chute terminates opposite a feeding mechanism from whence the nut-blanks are fed toward and into a holding mechanism. The bottom 47 of the chute member 38 is preferably shaped to accommodate the lowermost nut in the chute in proper angular position for the same to be introduced into the holding means.

*The feeding mechanism.*—This mechanism is best shown in Figs. 1, 3 and 12 of the drawings and comprises a hollow cylindrical bearing member 48 preferably formed on the rear portion of the chute 38. A movable cylindrical plunger 49 is arranged within said bearing member and has an attenuated threaded portion 50 extending rearwardly thereof. A block 51 is threaded onto said attenuated portion and adjustably secured thereon by means of a lock nut 52. Projecting laterally from said block, on either side thereof, are pins 53 adapted to be engaged, respectively, by the bifurcated ends 54 of a yoke portion 55 of a lever 56 which is journaled at 57 in brackets 58 projecting rearwardly from the body of the machine. The lever 56 has an arm 59 which is provided with a cam roller 60, which in turn engages a feed cam 61 fixed to the cam shaft 9. At a point intermediate the fulcrum 57 and the yoke portion is a pin 63 which engages with one end of a coiled spring 64, the other end of which is secured suitably to the body of the machine, said spring tending normally to urge the yoke portion of the lever forwardly in the direction of feed. The feed cam 61 operates at a predetermined point to cause the withdrawal of the feed plunger 49 from the advanced position in which it is normally maintained by reason of the spring 64. When moved into this withdrawn position the lower end 47 of the chute 38 is left unoccupied and a nut-blank, which may have been detained by reason of the plunger being in its advanced position, is permitted to drop down into the lowermost portion of the chute longitudinally opposite the feed plunger and in a position to be acted upon by the latter when the high portion 65 of the cam retreats from the cam roll 60, allowing the spring 64 to urge the feed plunger in a forward direction. This feeding takes place at a time in the operation of the machine when certain parts of the holding mechanism or magazine have been moved rearwardly toward the chute 38 (see Fig. 7). It will be obvious, therefore, that in certain embodiments of the invention the feeding may be of a yielding nature, and that accordingly if the machine should become choked by reason of the nuts not being properly discharged, or for any other reason, the feed plunger will yield against the action of the spring 64, thereby preventing further forward movement of the blanks relative to the holding means and obviating the possibility of breakage of the parts.

*The holding mechanism.*—The holding mechanism comprises essentially, in this embodiment of the invention, a splined collet chuck 66 (see Fig. 11) which, when enjoying full normal or relaxed position, permits the passage of a nut-blank therethrough without occasioning substantial pressure on said blank. This chuck is split to form gripper jaws 67 and comprises a conical annular wall 68. The interior of the chuck is fashioned to receive a hexagonal nut-blank and to hold the same against any rotary or annular displacement in the chuck. This chuck is connected by means of a tongue and groove joint, as indicated at 69, to a longitudinal magazine member 70 provided with interior faces or walls 71 corresponding to those of the chuck and coinciding with the interior walls thereof. This magazine member has a flange portion 72 toward the rear thereof, the inner or front side of which is adapted to abut a projecting cylindrical hub portion 73 extending rearwardly from the carrier 18. The magazine member 70 is keyed to said rearwardly extending cylindrical hub portion 73 and thereby held against rotary movement. A flanged clamping member 74 is adapted to be threaded over said rearwardly projecting hub portion 73 to confine the flanged portion 72 of the magazine member to hold the latter against relative longitudinal movement with the carrier 18. Between the carrier 18 and the magazine member 70 there is longitudinally slidably arranged a sleeve 75 terminating in a split end portion 76 having an inner annular conical wall 77 adapted to coact with the outer conical wall 68 of the gripper member. This sleeve has a longitudinal movement relative to the magazine 70 and the carrier 18 and accordingly slides between these two members for the purpose of bringing its conical inner wall 77 alternately into and out of engagement with the conical outer wall 68 of the gripper member. This movement is accomplished by means of bell crank levers 78 fulcrumed, as indicated at 79, on the carrier 18. The sleeve 75 is slotted at 80 to accommodate the inner ends 81 of arms 82 of the bell crank levers and to the rear of these slots there is provided a flared flange portion 83 within which is secured a ring 84 projecting rearwardly some distance beyond the end of said flange. A coaxial recess 85 is provided extending rearwardly into the projecting hub portion 73 of the carrier 18, and within this recess a contractile spring 86 is disposed adapted normally to urge the sleeve 75 in a forward direction to disengage the before-mentioned conical walls. Slidably mounted on said hub portion is a ring member 87 having a forwardly inclined annular face 88 which is adapted to intercept the outer ends 89 of the bell crank levers 78 when the same are occupying their normal position, caused by the spring 86 urging the sleeve 75 in a forward direction, the rear end walls of the slots 80 in said sleeve causing the bell crank levers to swing about their respective pivots 79. The rearward movement of the sleeve 75 is limited by an adjustable threaded tension member 90 which is disposed in the forward end of the carrier, interiorly recessed, as indicated at 91, and provided with an inner conical face 92 adapted to engage with an outer conical face 93 formed on the sleeve.

It will be obvious, therefore, that the hub member 12 is held against rotary movement in the upright portion of the body 1 by means of the key 14; that the carrier 18 is held against rotary movement in said first member by means of the spline or feather 19; that the magazine member 70 is held against rotary movement by means of a key, and that the sleeve 75 is held against rotary movement by means of the engagement of the lower ends of the arms of the bell crank levers engaging with the slots in said sleeve member. It will be equally obvious that the carrier is adapted to have a longitudinal movement relative to the upright portion 13 of the body 1 of the machine, that as this carrier moves longitudinally the sleeve and the magazine members are carried therewith, and that the sleeve member has a longitudinal movement between the magazine and the carrier. Projecting rearwardly and downwardly from the carrier 18 is a bifurcated bracket member 94 (Fig. 9) having arms 95 adapted to straddle a double bell crank lever 96 (Fig. 8) and serve as a fulcrum therefor. This bell crank lever has a pair of upwardly extending arms 97 provided on their inner sides with blocks 98 which are adapted to project into the annular groove 99 formed in the ring member 87. This bell crank lever is also provided with forwardly extending arms 100 adapted to straddle a yoke member 101 which carries a slidable block 102 therein. A bolt 103 is passed from one of the arms 100 to the other through the block 102 serving to provide a connection between the bell crank lever and an actuating lever 104. This actuating lever is fulcrumed at 105 in a bracket 106 arranged on the body 1 and is provided on the opposite side of said fulcrum with a cam roll 107 which coacts with an actuating cam 108 secured to the main cam shaft 9. The carrier 18 is provided with vertical ways 109 on opposite sides thereof and is suitably connected through the blocks 110 and the levers 112 to a rock shaft 113 journaled in the body of the machine. Disposed between the levers 112, extending rearwardly and fixed to said rock shaft 113, is a cam roll carrying lever 114 provided with a cam roll 115 adapted to coact with the face cam 116. This face cam actuates the carrier 18 through the mechanism just described to cause longitudinal movement of said carrier. Accordingly it will be seen that as the feed plunger, heretofore described, is retracted to permit a nut-blank to enter the bottom of the chute 38, it is desirable to actuate the carrier to carry the rear end of the magazine member back against or adjacent the opening in the chute. The feed plunger may then be advanced to pass the lowermost nut-blank of the chute from its position therein into the rear end of the magazine which will be at that time adjacent the chute.

It will be apparent that the magazine employed in this preferred embodiment accommodates a large number of nut-blanks at one time, and that the feed of the nut-blanks through the magazine is by successive nut-blanks urging those preceding along toward the gripper member. In starting the machine this magazine may be filled by hand, or sufficient time may be allowed to elapse to permit the same to be filled automatically. The cam 108, which operates to throw the ring member 87 in and out of engagement with the bell crank levers 78, is so timed that, as the feed plunger 49 is moving forwardly to urge a nut-blank into the magazine, the ring member is withdrawn from engagement with said bell crank levers to permit the spring 86 to urge the sleeve member forwardly, disengaging the conical faces of the sleeve member and the clutch, respectively, and permitting the gripper members to assume their normal ungripping position. Substantially at the end of the period of feed of the nut-blank the ring member is thrown into engagement with the bell crank levers to cause engagement of the said conical faces and bring about a pressure on the side walls of the nut-blank which at that time is partially opposite the gripper jaws to hold the same securely against longitudinal or angular displacement.

*The means adapted to cause register of the nut-blank with the holding means.*—As indicated at 117 in Figs. 1, 4 and 5, a bearing bracket is provided for a movable stop 118 which is splined, as indicated at 119, to permit longitudinal movement of the stop on the bracket while preventing relative rotary movement. An adjustable annular channel member 120 is provided on said stop at the forward end thereof and has an annular groove 121 into which the pins 122 of a yoke portion 123 of a lever 124 are adapted to project. This stop is actuated longitudinally by a cam 125 through the medium of lever 126, rock shaft 127 journaled in a bracket near the base of the body 1, lever 128 fixed to said rock shaft, connecting rod 129 connecting the end of the lever 128 with lever 124, which in turn is fulcrumed in a bracket 131 secured to the forward portion of the body of the machine. To secure the highest character of results in the planing or shaping operation of the blank, it is desirable that the latter should be determinably positioned within the holding means or grippers, so that a predetermined amount or portion of the blank will be exposed to the cutters or planers. Accordingly, the cam 125 operates at a predetermined time to advance the stop member 118 against the action of a spring 132 and holds said stop member, by reason of a dwell 133 on said cam, in a position where it will restrict the forward movement of the nut-blank as the column of nuts is fed forwardly by the feed plunger hereinbefore described. By this mechanism the amount of the forward travel of the nut is determined and the spring 64 yields until such time as the gripper members operate to clamp the nut-blank in its then position. As will be later described, the reciprocatory planers operate continuously in their reciprocating movement, and accordingly as it is desirable to advance the stop member opposite these planers, said stop member is provided with a plurality of slots, as indicated at 134, to accommodate the movement of the cutters. As the carrier 18 moves forward to bring the clamped nut-blank into planing position the cam 125 recedes and the stop 118 is caused to retreat by the action of the spring 132.

*The cutting or planing mechanism.*—Arranged radially on the forward side of the upright portion of the body 1 are a plurality of reciprocatory tool carriers 135, preferably six in number, every one of which is adapted to operate relative to a different face of a hexagonal nut. These tool carriers are movable in guideways 136 and are held therein by flange member 137 bolted or otherwise secured to said upright portion. Each tool carrier is provided with an adjustable planing or shaping tool 138 and all the carriers are preferably designed to operate simultaneously in one direction or the other. The planing tool or planer is preferably of a rigid character as by using a tool of this nature a number of them may be arranged to operate within a comparatively small radius, as, for example, that offered by the smaller sizes of nut-blanks. Accordingly, a series of cutters may be used for the simultaneous cutting of recesses rendering the machine much more efficient and rapid in operation. With a plurality of oppositely disposed cutters operating simultaneously, the strain on the blank caused by one cutter finds compensation in the action of those opposed and there is less tendency to dislodge or displace the blank. Further, it being desirable, because most convenient, to hold the blank against the action of the cutters, by gripping the exterior peripheral walls thereof, a character of cutting is therefore desirable which will accept the benefits of this gripping action to its highest degree. A rigid cutter moving toward the grippers in a plane at right angles thereto will avail itself of the function of the grippers to the maximum. Preferably the planers 138 move inwardly on their cutting stroke, stripping or paring the material, and such movement is in a plane at 90° to the longitudinal holding walls of the gripper member.

Returning for a moment to a consideration of the short shafts 24, hereinbefore described as being supported rotatably in the upright portion of the body 1, it will be seen that the forward end of each of these shafts is provided with an eccentric stud portion 139 projecting opposite the lateral walls of the guide-ways for the cutter carriers. A rectangular block 140 is mounted upon the eccentric portion 139 and said block is adapted to have a slight lateral play in guideways 141 provided in the cutter carriers 135. It will be obvious that as the shafts 24 are continuously rotated by reason of their respective pinions meshing with the gear 22 in a manner which has been previously described, this continuous rotary movement is transformed into a reciprocatory movement of the cutter carrier by means of the eccentric stud portion 139. It will be noted, therefore, that as the cutters move inwardly on one leg of their reciprocation they move transversely of the axis or top opening of the blank and will simultaneously cut a plurality of recesses in a nut-blank provided that the latter has been advanced opposite the plane of reciprocation.

In the operation of this machine a quantity of nut-blanks are placed in the hopper 26. The rotary plate mechanism, heretofore described, continuously rotates and selects nuts individually from the hopper and drops them into the chute member with their crowns facing in a forward direction. The feed plunger then operates to permit the lowermost nut-blank to drop opposite the opening in the chute and on its forward movement transfers said nut-blank from the chute to the magazine. This operation may continue several times until the magazine is packed with nut-blanks, all having their crowns facing in a forward direction, and each successive nut-blank abutting the one ahead. When the magazine is sufficiently packed a nut-blank will be presented opposite the gripper jaws of the holding mechanism, and at that time the cams and associated mechanisms are so timed and arranged that the stop member is in position to limit the feeding action of the plunger, causing an exact registration of the nut-blank with the gripper member, whereby a portion of said nut-blank projects beyond said gripper member and is adapted to be exposed to the action of the planers. At this time the carrier has been moved longitudinally to a rearward position by the action of the cam 116, and at substantially this time the cam 108 operates to cause movement of the sleeve member longitudinally, causing a gripping action of the gripper jaws on the nut-blank. The carrier or slide is then advanced carrying the sleeve member, the magazine, the gripper jaws and the nut-blank tightly gripped by the latter. There then begins a series of progressive planer-positioning movements or advancements transversely of the cutting plane caused by the cam 116, whereby the carrier is slightly advanced at every reciprocation of the planers at the same time preserving the same angular relation with respect to the cutting planes, thereby producing a slot or a plurality of slots which have been cut in easy stages and thereby progressively enlarged. It will be noted that the cam path of the cam 116 is also provided with retreats after each advance. The purpose of these is to cause a slight retreat of the carrier after each cutting in order to permit the planes to return to initial position relieved of their strict engagement with the nut. As the cam-shaft nears the end of its revolution and the cutting is finished, the stop 118 advances as the carrier retreats and the feed plunger operates to urge another nut from the chute into the magazine. The gripper jaws having at this time been released from their engagement with the cut nut-blank permit the same to be moved wholly beyond the ends thereof, and at this time a stripper or knockout 142 is actuated to strike the finished nut out of the path of the carrier and its associated mechanism. The second nut-blank is at this time in position to be operated upon as has been just previously described.

The stripper or knockout comprises a lever 143 fulcrumed on a bracket which in turn is associated with the upright portion of the body 1. An arm 144 of this lever is connected by a rod 145 with an actuating lever 146, which in turn is fulcrumed at 147 to the body of the machine and has a cam engaging arm 148 engaging and operated by a cam member 149 fixed to the main cam-shaft 9.

Having described my invention, what I claim as new and desire to secure by Letters Patent is:—

1. In an apparatus of the character described, in combination, means adapted to hold a nut-blank whereby a portion thereof may be exposed, means adapted to feed a nut-blank to said holding means, and means adapted to cut simultaneously a plurality of recesses at angles to each other in said blank.

2. In an apparatus of the character described, in combination, means adapted to hold a nut-blank whereby a portion thereof may be exposed, means adapted to feed a nut-blank to said holding means, planing means, and means adapted to cause relative movement between said planing means and said holding means to plane slots between a plurality of exterior faces of said nut-blank and a bolt-hole thereof, respectively.

3. In an apparatus of the character described, in combination, means adapted to hold a nut-blank whereby a portion thereof may be exposed, means adapted to feed a nut-blank to said holding means, a pair of cutters, and means adapted to move said cutters toward each other to shape said nut-blank.

4. In an apparatus of the character described, in combination, means adapted to hold a nut-blank whereby a portion thereof may be exposed, means adapted to feed a nut-blank to said holding means, and a pair of oppositely disposed cutters adapted to cut a recess in said nut-blank from opposite faces thereof to a common bolt-hole.

5. In an apparatus of the character described, in combination, means adapted to hold a nut-blank whereby a portion thereof may be exposed, means adapted to feed a nut-blank to said holding means, a plurality of cutters, and means adapted to actuate said cutters to cut recesses simultaneously in said nut-blanks between exterior faces thereof and a bolt-hole thereof, respectively.

6. In an apparatus of the character described, in combination, means adapted to hold a nut-blank against rotary movement and whereby a portion of said blank may be exposed, a plurality of radially disposed reciprocatory cutters adapted to act upon said blank to cut radial slots therein, and means adapted to actuate said cutters to cut slots simultaneously in said blank.

7. In an apparatus of the character described, in combination, means adapted to hold a nut-blank against rotary movement and whereby a portion of said blank may be exposed, a plurality of radially disposed reciprocatory cutters adapted to act upon said blank to cut radial slots therein, means adapted to actuate said cutters to cut slots simultaneously in said blank, and means adapted to intermittently progressively advance said blank relative to the cutting plane of said cutters to cause progressive enlargement of said slots.

8. In an apparatus of the character described, in combination, means adapted to hold a nut-blank whereby a portion thereof may be exposed, means adapted to feed a nut-blank to said holding means, means adapted to provide a continuous supply of nut-blanks to said feeding means, a pair of cutters, and means adapted to move said cutters toward each other to shape said nut-blank.

9. In an apparatus of the character described, in combination, means adapted to hold a nut-blank whereby a portion thereof may be exposed, means adapted to feed a nut-blank to said holding means, means adapted to provide a continuous supply of nut-blanks to said feeding means, a plurality of cutters, and means adapted to actuate said cutters to cut recesses in said nut-blank between the exterior faces thereof and a bolt-hole thereof, respectively.

10. In an apparatus of the character described, in combination, means adapted to hold a nut-blank whereby a portion thereof may be exposed, means adapted to feed a nut-blank to said holding means, means adapted to automatically supply nut-blanks with corresponding portions respectively positioned in a common direction, a pair of cutters, and means adapted to move said cutters toward each other to shape said nut-blanks.

11. In an apparatus of the character described, in combination, means adapted to hold a nut-blank whereby a portion thereof may be exposed, means adapted to feed a nut-blank to said holding means, means adapted to automatically supply nut-blanks with corresponding portions respectively positioned in a common direction, a plurality of cutters, and means adapted to actuate said cutters to cut recesses in said nut-blanks between the exterior faces thereof and a bolt-hole thereof, respectively.

12. In an apparatus of the character described, in combination, means adapted to hold a nut-blank whereby a portion thereof may be exposed, a hopper, means adapted to feed a nut-blank to said holding means, means adapted to select nut-blanks from said hopper to present them to said feeding means with corresponding portions respectively positioned in a common direction, a pair of cutters, and means adapted to move said cutters toward each other to shape said nut-blank.

13. In an apparatus of the character described, in combination, means adapted to hold a nut-blank whereby a portion thereof may be exposed, means adapted to feed a nut-blank to said holding means, a hopper, means adapted to select nut-blanks from said hopper to present them to said feeding means with corresponding portions respectively positioned in a common direction, a plurality of cutters, and means adapted to actuate said cutters to cut recesses in said nut-blanks between different exterior faces thereof and a bolt-hole thereof, respectively.

14. In an apparatus of the character described, in combination, means adapted to hold a blank whereby a portion thereof may be exposed, said means comprising gripper jaws having tapering walls, a movable sleeve having similarly tapering walls and means adapted to cause a relative movement between said gripper jaws and said sleeve to grip a blank, means adapted to feed blanks to said holding means, cutting means, and means adapted to cause relative movement between said holding means and said cutting means to cut said blank, said holding means adapted to hold said blank against rotative movement and said cutting means adapted to move upon said blank simultaneously from different directions to cut recesses therein.

15. In an apparatus of the character described, in combination, means adapted to grip a nut-blank whereby a portion thereof may be exposed, means adapted to feed a nut-blank to said gripping means, means comprising a stop adapted to limit the action of the feeding means to cause register between said nut-blank and said holding means, and adjustable means to provide various degrees of pressure of said gripping means on said nut-blank.

16. In an apparatus of the character described, in combination, means adapted to grip a nut-blank whereby a portion thereof may be exposed, yielding means adapted to feed a nut-blank to said gripping means, means comprising a stop adapted to limit the action of the feeding means to cause register between said nut-blank and said holding means, and adjustable means to provide various degrees of pressure of said gripping means on said nut-blank.

17. In an apparatus of the character described, in combination, means adapted to grip a nut-blank whereby a portion thereof may be exposed, spring means adapted to feed a nut-blank to said gripping means, means comprising a stop adapted to limit the action of the feeding means to cause register between said nut-blank and said holding means, and adjustable means to provide various degrees of pressure of said gripping means on said nut-blank.

18. In an apparatus of the character described, in combination, means adapted to hold a nut-blank whereby a portion thereof may be exposed, means adapted to feed nut-blanks to said holding means, a reciprocatory planer, means adapted to actuate said planer to plane a recess in said nut-blank, and means adapted to vary the relative positions of said nut-blank and said planer whereby upon subsequent actuation of said planer said recess is enlarged.

19. In an apparatus of the character described, in combination, means adapted to hold a nut-blank whereby a portion thereof may be exposed, means adapted to feed nut-blanks to said holding means, a reciprocatory planer, means adapted to actuate said planer to plane a recess in said nut-blank, and means adapted intermittently to vary the relative positions of said nut-blank and said planer whereby upon subsequent actuation of the latter said recess is progressively enlarged.

20. In an apparatus of the character described, in combination, means adapted to hold a nut-blank whereby a portion thereof may be exposed, means adapted to feed nut-blanks to said holding means, a reciprocatory planer, means adapted to actuate said planer to plane a recess in said nut-blank, and means adapted to advance said nut-blank relative to said planer whereby upon subsequent actuation of the latter said recess is enlarged.

21. In an apparatus of the character described, in combination, means adapted to hold a nut-blank whereby a portion thereof may be exposed, means adapted to feed nut-blanks to said holding means, a reciprocatory planer, means adapted to actuate said planer to plane a recess in said nut-blank, and means adapted intermittently to advance said nut-blank relative to said planer whereby upon subsequent actuation of the latter said recess is progressively enlarged.

22. In an apparatus of the character described, in combination, means adapted to hold a nut-blank whereby a portion thereof may be exposed, means adapted to feed nut-blanks to said holding means, a reciprocatory planer, means adapted to actuate said planer to plane a recess in said nut-blank, and means adapted to vary the relative positions of said nut-blank and said planer whereby upon subsequent actuation of the latter said recess is enlarged.

23. In an apparatus of the character described, in combination, means adapted to hold a nut-blank whereby a portion thereof may be exposed, means adapted to feed nut-blanks to said holding means, a reciprocatory planer, means adapted to move said planer in one direction of reciprocation to plane a recess in said nut-blank, and means adapted to relieve the strict engagement of said planer with said nut-blank as said planer is moved in the opposite direction.

24. In an apparatus of the character described, in combination, means adapted to hold a nut-blank whereby a portion thereof may be exposed, means adapted to feed nut-blanks to said holding means, a reciprocatory planer, means adapted to move said planer in one direction of reciprocation to plane a recess in said nut-blank, and means adapted to withdraw said nut-blank from said planer as the latter retreats from its planing stroke.

25. In an apparatus of the character described, in combination, means adapted to hold a nut-blank whereby a portion thereof may be exposed, means adapted to feed nut-blanks to said holding means, a reciprocatory planer, means whereby said nut-blank may be moved into position for planing, means adapted to actuate said planer to plane a recess in said nut-blank, means adapted to vary the relative position of said nut-blank and said planer whereby upon subsequent planing said recess is enlarged, and means adapted to relieve the strict engagement between the planer and the nut-blank as the former retreats in non-planing relation with the latter.

26. In an apparatus of the character described, in combination, means adapted to hold a nut-blank whereby a portion thereof may be exposed, means adapted to feed nut-blanks to said holding means, a reciprocatory planer, means whereby said nut-blank may be moved into position for planing, means adapted to actuate said planer to plane a recess in said nut-blank, means adapted to advance said nut-blank intermittently to cause said recess to be enlarged upon subsequent actuation of said planer, and means adapted to withdraw said nut-blank from said planer to relieve the strict engagement therebetween as the latter retreats past said nut-blank.

27. In an apparatus of the character described, in combination, means adapted to hold a nut-blank whereby a portion thereof may be exposed, means adapted to feed a nut-blank to said holding means, means adapted to plane a recess in said nut-blank, and means adapted to discharge said nut-blank from said holding means.

28. In an apparatus of the character described, in combination, means adapted to hold a nut-blank whereby a portion thereof may be exposed, means adapted to feed a nut-blank to said holding means, planing means, means adapted to cause relative movement between said planing means and said holding means to plane a slot in said nut-blank, and means adapted to discharge said nut-blank from said holding means.

29. In an apparatus of the character described, in combination, means adapted to hold a nut-blank whereby a portion thereof may be exposed, means adapted to feed a nut-blank to said holding means, means adapted to provide a continuous supply of nut-blanks to said feeding means, a pair of cutters, means adapted to move said cutters toward each other to shape said nut-blank, and means adapted to discharge said nut-blank from said holding means.

30. In an apparatus of the character described, in combination, means adapted to hold a nut-blank whereby a portion thereof may be exposed, means adapted to feed a nut-blank to said holding means, planing means, means adapted to provide a continuous supply of nut-blanks to said feeding means, means adapted to cause relative movement between said planing means and said holding means to plane a slot in said nut-blank, and means comprising a movable member adapted to be retracted to receive another nut from the supply and adapted to be advanced to move the cut nut-blank beyond said holding means to discharge the same from the apparatus.

31. In an apparatus of the character described, in combination, means adapted to hold a nut-blank whereby a portion thereof may be exposed, means adapted to feed a nut-blank to said holding means, means adapted to automatically supply nut-blanks with corresponding portions respectively positioned in a common direction, a pair of cutters, means adapted to move said cutters toward each other to shape said nut-blank, means adapted to discharge said nut-blank from said holding means, and means comprising a movable member adapted to be retracted to receive another nut from the supply and adapted to be advanced to move the cut nut-blank beyond said holding means to discharge the same from the apparatus.

32. In an apparatus of the character described, in combination, means adapted to hold a nut-blank whereby a portion thereof may be exposed, means adapted to feed a nut-blank to said holding means, means adapted to automatically supply nut-blanks with corresponding portions respectively positioned in a common direction, a pair of cutters, means adapted to move said cutters toward each other to shape said nut-blank, means adapted to discharge said nut-blank from said holding means, and means adapted to deflect said nut-blank away from said holding and cutting means.

33. In an apparatus of the character described, in combination, gripper mechanism to hold a blank to be planed, feeding mechanism, a stop to limit the movement of said blank by said feeding means, a reciprocatory planer, actuating means therefor, and a movable carrier for said gripper members.

34. In an apparatus of the character described, in combination, gripper mechanism to hold a blank to be planed, feeding mechanism, a stop to limit the movement of said blank by said feeding means, a reciprocatory planer, actuating means therefor, a movable carrier for said gripper members, and means adapted to intermittently actuate said carrier to coact with said planer to progressively plane a recess in said blank.

35. In an apparatus of the character described, in combination, a nut holder, a series of cutters, and means adapted to cause simultaneous relative movement between said holder and a plurality of the cutters of said series and thereby effect cutting of a nut held by said holder.

36. In an apparatus of the character described, in combination, a nut holder, a series of planers adapted to simultaneously operate on a single nut, and means adapted to cause simultaneous relative movement between said holder and a plurality of said planers and thereby effect planing of a nut held by said holder.

37. In an apparatus of the character described, in combination, means adapted to hold a blank whereby a portion thereof may be exposed, a cutter coöperating to cut a recess in the blank, and means adapted to advance the blank with respect to the cutting plane of the cutter simultaneously preserving the same angular relation of the blank therewith whereby upon subsequent operation said recess is enlarged by said cutter.

38. In an apparatus of the character described, in combination, means adapted to hold a blank whereby a portion thereof may be exposed, a plurality of cutters simultaneously operative on a held nut blank to cut recesses therein, and means adapted to advance the blank with respect to the cutting planes of the cutters simultaneously preserving the same angular relation of the blank therewith whereby upon subsequent operation said recesses are enlarged by said cutters.

39. In an apparatus of the character described, in combination, means adapted to hold a blank whereby a portion thereof may be exposed, a plurality of cutters simultaneously operative on a held nut blank to cut recesses therein at angles to each other, and means adapted to advance the blank with respect to the cutting planes of the cutters simultaneously preserving the same angular relation of the blank therewith whereby upon subsequent operation said recesses are enlarged by said cutters.

40. In an apparatus of the character described, in combination, means adapted to hold a blank whereby a portion thereof may be exposed, a plurality of cutters operative on a held nut blank to cut recesses therein at angles to each other, and means adapted to advance the blank with respect to the cutting planes of the cutters simultaneously preserving the same angular relation of the blank therewith whereby upon subsequent operation said recesses are enlarged by said cutters.

41. In an apparatus of the character described, in combination, means comprising a gripper adapted to hold a blank whereby a portion thereof may be exposed, a plurality of cutters simultaneously operative on a held nut blank to cut recesses therein, and means adapted to advance the blank with respect to the cutting planes of the cutters simultaneously preserving the same angular relation of the blank therewith whereby upon subsequent operation said recesses are enlarged by said cutters.

42. In an apparatus of the character described, in combination, means comprising a gripper adapted to hold a blank whereby a portion thereof may be exposed, a plurality of cutters simultaneously operative on a held nut blank to cut recesses therein at angles to each other, and means adapted to advance the blank with respect to the cutting planes of the cutters simultaneously preserving the same angular relation of the blank therewith whereby upon subsequent operation said recesses are enlarged by said cutters.

43. In an apparatus of the character described, in combination, means comprising a gripper adapted to hold a blank whereby a portion thereof may be exposed, a plurality of cutters operative on a held nut blank to cut recesses therein, and means adapted to advance the blank with respect to the cutting planes of the cutters simultaneously preserving the same angular relation of the blank therewith whereby upon subsequent operation said recesses are enlarged by said cutters.

44. In an apparatus of the character described, in combination, means adapted to hold a blank so as to expose a portion thereof to the operation of a plurality of cutters, means adapted to feed a blank to said holding means, a plurality of cutters, and means adapted to cause relative reciprocatory movement between said cutters to effect slotting of said blank at a plurality of different parts.

45. In an apparatus of the character described, in combination, means adapted to hold a blank so as to expose a portion thereof to the operation of a plurality of cutters, means adapted to feed a blank to said holding means, a plurality of cutters, and means adapted to cause relative movement between said cutters toward and from a common center to effect slotting of said blank at a plurality of different places.

46. In an apparatus of the character described, in combination, means adapted to hold a nut-blank so as to expose a face thereof, said blank having a tap opening, a plurality of cutters, and means adapted to cause movement of said cutters across said face toward and from said opening to thereby cut slots in said face, the forward movement of said cutters terminating in said opening.

47. In an apparatus of the character described, in combination, means adapted to hold a nut-blank so as to expose a face thereof, said blank having a tap opening, a plurality of cutters, and means adapted to cause simultaneous movement of said cutters across said face toward and from said opening to thereby cut slots in said face.

48. In an apparatus of the character described, in combination, means adapted to hold a nut-blank so as to expose a portion thereof, a plurality of planers, means adapted to cause relative movement between said planers to effect slotting of said blank at a plurality of different points, and means adapted to automatically effect relative movement between said blank and said planers transversely of the cutting plane between the planing operations.

49. In an apparatus of the character described, in combination, means adapted to hold a nut-blank so as to expose a portion thereof, a plurality of planers, means adapted to cause relative movement between said planers toward and from a common center to effect slotting of said blank at a plurality of different points, and means adapted to automatically effect relative movement between said blank and said planers transversely of the cutting plane between the planing operations.

50. In an apparatus of the character described, in combination, means adapted to hold a nut-blank so as to expose a face thereof, said blank having a tap opening, a plurality of planers, means adapted to cause simultaneous movement of said planers across said face toward and from said opening to thereby cut slots in said face, the forward movement of said cutters terminating in said opening, and means adapted to automatically effect relative movement between said blank and said planers transversely of the cutting plane between the cutting operations of said planers.

51. In an apparatus of the character described, in combination, nut-blank gripping means, a plurality of reciprocatory planers disposed at different points around said gripping means, means adapted to feed nut-blanks to said gripping means, means adapted to open and close said gripping means, and means adapted to cause reciprocation of said planers and thereby recess a nut-blank held by said grippers.

52. In an apparatus of the character described, in combination, a slide comprising a gripper, means adapted to feed nut-blanks to said gripper, a cutter adapted to reciprocate transversely of the path of said slide, and means adapted to move said slide to dispose the gripped nut in position to have a recess made therein by said cutter.

53. In an apparatus of the character described, in combination, means adapted to hold a nut-blank whereby a portion thereof may be exposed, means adapted to feed a nut-blank to said holding means, a plurality of planers, and means adapted to cause said planers to plane a plurality of recesses in said blank simultaneously.

54. In an apparatus of the character described, in combination, means adapted to hold a nut-blank, whereby a portion thereof may be exposed, means adapted to feed a nut-blank to said holding means, means adapted to plane a recess in said blank comprising a planer adapted to reciprocate transversely of the axis of the blank, and means adapted to cause relative progressive planer-positioning movement between the plane of reciprocation of said planer and the blank held by said holder between successive planing movements of said planer.

55. In an apparatus of the character described, in combination, means adapted to hold a nut-blank whereby a portion thereof may be exposed, a plurality of planers adapted to reciprocate transversely of the axis of the held blank simultaneously, and means adapted to cause relative progressive planer-positioning movement between the planes of reciprocation of said planers and said blank between successive planing movements of said planers.

56. In an apparatus of the character described, in combination, means adapted to hold a nut-blank whereby a portion thereof may be exposed, means adapted to feed a nut-blank to said holding means comprising a device to automatically supply nut-blanks to said holding means with corresponding faces respectively positioned in a common direction, nut-blank planing means, and means adapted to cause relative movement between said planing means and said holding means to plane slots in said faces of successively held blanks, respectively.

In testimony whereof I affix my signature, in the presence of two witnesses.

EMILE C. BOERNER.

Witnesses:
  E. BURDSALL,
  R. H. BURDSALL.